Patented Apr. 3, 1934

1,953,754

UNITED STATES PATENT OFFICE 1,953,754

PROCESS OF TREATING FOOD MATERIALS

Herbert C. Gore, Scarsdale, and Charles N. Frey, New York, N. Y., assignors, by mesne assignments, to Standard Brands Incorporated, Dover, Del., a corporation of Delaware No Drawing. Application June 19, 1929, Serial No. 372,015

8 Claims. (Cl. 99—11)

This invention relates to food products, and, more particularly, to processes of treating food materials, such as malt syrup, apple, grape and citrus fruit juices and the like in concentrated form but otherwise substantially in their natural state, with yeast to produce new and desirable properties therein without fermenting them to any material extent.

A general object of the invention is to subject such food materials to bioplastic action of yeast in a manner such as to improve their flavor, quality, composition and filterability without necessarily destroying their general identity.

A more specific object is to treat relatively concentrated food materials of the type referred to with yeast under such conditions and for such periods of time as to produce a mellowing of the original flavor and impart a slight fermented flavor thereto, whereupon action of the yeast is terminated prior to any marked fermentation and the material is further concentrated without material loss of the newly developed flavor.

Other objects of the invention will in part be obvious and will in part appear hereinafter.

The invention accordingly comprises the several steps and the relation and order of one or more of such steps with respect to each of the others thereof which will be exemplified in the process hereinafter disclosed and the scope of the application of which will be indicated in the claims.

In addition to the enzymase which acts on sugar to produce alcohol by fermentative action, yeast contains a number of other enzymes, each of which tends to act under proper conditions to modify or break down the sugars, starch, dextrin, proteins, amino acids, pectins and other similar bodies with which the yeast may be in contact. Inclusive of, and in addition to, such enzymotic activities, yeast is known to exhibit certain other powers, typical of one of which is the power to convert isoleucine into isoamyl alcohol, ammonia and carbon dioxide (Ehrlich- Ber. de. Chem. Ges. 40, 1, 1027, of 1907). These activities may be generally included under the term bioplastic activity, as distinguished from the fermentative activity.

In accordance with the principles of the present invention, such bioplastic activity is utilized to cause new and useful changes in suitable food products, such as malt syrup or fruit juices in concentrated form but otherwise substantially in their natural state, under conditions such as to impart a slight fermented flavor to the products while simultaneously producing a smoothing out or mellowing of the original flavors present and an improvement in the filterability of the material, without continuing the treatment to an extent such that the general identity of the material treated is destroyed. Different kinds of yeast possess different flavor-producing properties, and it is to be understood that yeast of various types may be employed by our process.

In general, the length of treatment depends upon the nature, dilution and temperature of the food material being treated, and upon the amount of yeast used. After the treatment has been carried on to the desired degree, the activity of the yeast is terminated and the food product may be filtered. If it is not to be used at once, it is either concentrated to a degree such that it has the desired keeping qualities or is sterilized and bottled with or without previous carbonation. It is preferred to carry out the aforesaid treatment with food materials of such concentration that the flavor-modifying action in general, and particularly the formation of alcohol, may be controlled such that the further concentration of the material may be accomplished without undue loss of the newly developed flavoring constituents.

Although the invention is not to be limited thereto, a typical example of the method of treating materials in accordance with the principles of the invention is as follows: About 5 grams of bakers' yeast is added to about 800 grams of malt syrup having a concentration of about 50° Balling. The temperature is adjusted to about 30° C. and is maintained for about 16½ hours. Thereafter the temperature is raised to about 50° C. and maintained for a short time to destroy the activity of the yeast. To facilitate filtration 10 grams of kieselguhr or other suitable filtering aid is added, whereupon the mass is filtered through a Büchner funnel. Finally, the filtrate is concentrated in vacuo to a concentration of about 80° Balling, or preferably about $\frac{9}{10}$ths thereof is concentrated to about 85° Balling, and the remaining $\frac{1}{10}$th is added to bring back the concentration to about 80° Balling, which is sufficient for proper keeping quality and insures a retention of the flavor. The initial concentration of the sugar material given in the above example is such as not entirely to prevent fermentative action by the yeast, but such action is inhibited to a degree such that the alcohol produced prior to concentration is only about 2%, and the finally concentrated product contains less than ½% by volume. The production of alcohol, even in limited amounts, is unnecessary for the development of the modification of flavor, but the action of the yeast for a short time produces the desired flavor, and this may be accomplished with an alcohol content of less than ½ of 1%. To accomplish the results aforesaid, sugar concentrations of from 25-50% may be used, although total concentrations of from 40°-50° Balling are preferred. The initial holding temperatures may also be varied widely without departing from the spirit of the invention, although the range of from 20°-30° C. is preferred.

In accordance with the foregoing procedure the flavor, quality, composition and filterability of various food materials may be improved without destroying the general identity of the food materials by subjecting them under certain definitive conditions to the bioplastic action of yeast. As above indicated, the food materials undergoing treatment may be malt syrup, the juices from different varieties of apple, particularly those recognized as yielding a considerable amount of juice, various varieties of grape, and various citrus fruits, as lemon, lime, orange and grapefruit, the juices being obtained in the usual manner by crushing or grinding the fruit to a pulp and subsequently expressing.

Although the exact nature of the reactions, and the modifications in the food product which result from the treatment thereof as aforesaid, are not ascertainable, it will be seen that a new and useful result has been attained, and since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described our invention, what we claim as new and desire to secure by Letters Patent is:

1. A process comprising in combination treating food materials of the class consisting of malt syrup, apple, grape and citrus fruit juices in concentrated form but otherwise substantially in their natural state, by adding yeast to the material, allowing bioplastic action to proceed until the flavor of the material is modified, terminating the bioplastic action before the general identity of the material is destroyed, and thereafter further treating said material to impart keeping quality thereto.

2. A process comprising in combination treating food materials of the class consisting of malt syrup, apple, grape and citrus fruit juices in concentrated form but otherwise substantially in their natural state, by adding yeast to the material, allowing bioplastic action to proceed until the flavor of the material is modified, terminating the bioplastic action before the general identity of the material is destroyed, and thereafter sterilizing, carbonating and bottling said material.

3. A process comprising in combination treating food materials of the class consisting of malt syrup, apple, grape and citrus fruit juices in concentrated form but otherwise substantially in their natural state, by adding yeast to the material, allowing bioplastic action to proceed until the flavor of the material is modified, terminating the bioplastic action before the general identity of the material is destroyed, and thereafter filtering, sterilizing, carbonating and bottling said material.

4. A process comprising in combination treating food materials of the class consisting of malt syrup, apple, grape and citrus fruit juices by partially concentrating the material to a density of from 40°-50° Balling, adding yeast thereto, allowing bioplastic action to proceed until the flavor of the material is modified, terminating the bioplastic action before the general identity of the material is destroyed, and thereafter further concentrating the material in vacuo.

5. A process comprising in combination treating food materials of the class consisting of malt syrup, apple, grape and citrus fruit juices by concentrating the material to a density of between 40°-50° Balling, adding about ½% of bakers' yeast thereto, maintaining the temperature at between 20°-30° C. for about 16 hours, then heating the mixture to about 50° C. to kill the yeast, filtering the mixture, and concentrating the filtrate to a density of about 80° Balling.

6. A process of treating malt syrup in substantially its natural state, which comprises in combination, adjusting the density of the malt syrup to about 50° Balling, adding bakers' yeast thereto in the proportion of about 5 grams to 800 grams, maintaining the temperature of the mixture at about 30° for about 16 hours, raising the temperature of the mixture to about 50° C. to terminate the action of the yeast, adding a filtering aid, such as kieselguhr, and filtering the mixture, concentrating about $\tfrac{7}{10}$ths of the filtrate in vacuo to a density of about 85° Balling, and adding the remainder of the filtrate to the concentrated portion.

7. A process comprising in combination treating food materials of the class consisting of malt syrup, apple, grape and citrus fruit juices by concentrating the material to a density of between 40°-50° Balling, adding yeast thereto, maintaining the mixture at a temperature of about 20°-30° C. until about 2% of alcohol is formed, whereby bioplastic action proceeds sufficiently to modify the flavor of the material, terminating the action of the yeast before the general identity of the material is destroyed by raising the temperature to about 50° C., adding a filtering aid and filtering the mixture, and concentrating the filtrate in vacuo to a density of about 80° Balling.

8. A process comprising in combination treating food materials of the class consisting of malt syrup, apple, grape, and citrus fruit juices in concentrated form but otherwise in substantially natural state by adding yeast to the material, allowing bioplastic action to proceed until the flavor of the material is modified, and terminating said bioplastic action before the general identity of the material is destroyed.

HERBERT C. GORE.
CHARLES N. FREY.